United States Patent

Neff

[11] Patent Number: 6,118,360
[45] Date of Patent: Sep. 12, 2000

[54] LINEAR ACTUATOR

[75] Inventor: Edward A. Neff, Rancho Sante Fe, Calif.

[73] Assignee: Systems, Machines, Automation Components Corporation, Carlsbad, Calif.

[21] Appl. No.: 09/268,844

[22] Filed: Mar. 16, 1999

Related U.S. Application Data

[63] Continuation-in-part of application No. 08/587,878, Jan. 11, 1996, Pat. No. 5,952,589.

[51] Int. Cl.⁷ .............................. H01F 7/08; H02K 41/00
[52] U.S. Cl. .............................................. 335/222; 310/13
[58] Field of Search ................................ 335/222, 229; 310/12, 13, 14

[56] References Cited

U.S. PATENT DOCUMENTS

| | | |
|---|---|---|
| 3,272,347 | 9/1966 | Lemelson . |
| 3,711,807 | 1/1973 | Yamashita et al. ...................... 336/205 |
| 3,743,093 | 7/1973 | Klancnik . |
| 3,987,551 | 10/1976 | Kienle . |
| 3,993,565 | 11/1976 | Holthuis . |
| 4,049,123 | 9/1977 | Fegley et al. . |
| 4,215,301 | 7/1980 | Mason . |
| 4,387,935 | 6/1983 | Studer ....................................... 310/12 |
| 4,484,118 | 11/1984 | Manabe et al. . |
| 4,498,023 | 2/1985 | Stout . |
| 4,510,683 | 4/1985 | Fedde et al. . |
| 4,575,652 | 3/1986 | Gogue . |
| 4,653,794 | 3/1987 | Atlas . |
| 4,750,272 | 6/1988 | Caddell . |
| 4,759,124 | 7/1988 | Snyder et al. . |
| 4,784,539 | 11/1988 | Lehmkuhl . |
| 4,809,430 | 3/1989 | Maruyama et al. . |
| 4,821,460 | 4/1989 | Wegmann . |
| 4,913,613 | 4/1990 | Hirschmann . |
| 4,922,434 | 5/1990 | Fule . |
| 4,935,676 | 6/1990 | Pelta . |
| 5,016,238 | 5/1991 | Shtipelman et al. ..................... 369/215 |
| 5,175,456 | 12/1992 | Neff et al. . |
| 5,310,064 | 5/1994 | Neff et al. . |
| 5,315,189 | 5/1994 | Neff et al. . |
| 5,317,222 | 5/1994 | Neff et al. . |
| 5,399,983 | 3/1995 | Nagasawa . |
| 5,414,620 | 5/1995 | Kauffman . |
| 5,430,360 | 7/1995 | Rosenthal et al. . |
| 5,446,323 | 8/1995 | Neff et al. . |
| 5,517,190 | 5/1996 | Gunn . |
| 5,598,044 | 1/1997 | Satomi et al. . |

FOREIGN PATENT DOCUMENTS

| | | |
|---|---|---|
| 0 277 656 | 10/1988 | European Pat. Off. . |
| 3831974 | 3/1990 | Germany . |

*Primary Examiner*—Michael L. Gellner
*Assistant Examiner*—Raymond Barrera
*Attorney, Agent, or Firm*—Nydegger & Associates

[57] ABSTRACT

A linear actuator includes a plurality of magnetic plates and a ferrite core with a conductive cover which are mounted on the actuator body to generate a permanent magnetic field. The linear actuator also includes a metal bobbin which has an outer surface and which is formed with an aperture that defines an inner surface for the bobbin. Further, the bobbin is formed with a gap which extends along its length and which intersects the bobbin from its inner to its outer surface. An insulating insert is placed in the gap. Finally, a winding is wrapped around the outer surface of the bobbin to form an electromagnetic coil, and the coil on the bobbin is slidingly mounted on the actuator to receive the ferrite core through the bobbin's aperture. Electrical current can then be selectively applied to the winding to interact with the permanent magnetic field and thereby cause reciprocating motion of the coil. Due to the gap in the bobbin, an induced current which would otherwise hinder the desired reciprocating motion of the coil does not form on the outer surface of the bobbin. Due to the conductive cover, the response time of the coil to the applied current is reduced. In this manner, precise, high speed reciprocating motion in the linear actuator of the present invention is achieved.

17 Claims, 2 Drawing Sheets

LINEAR ACTUATOR

This application is a continuation-in-part of application Ser. No. 08/587,878 filed Jan. 11, 1996, now U.S. Pat. No. 5,952,589. The contents of application Ser. No. 08/587,878 are incorporated herein by reference.

FIELD OF THE INVENTION

The present invention pertains generally to linear actuators. More specifically, the present invention pertains to linear actuators in which an electrical current is selectively applied to an electromagnetic coil within the actuator to cause the coil to move with a reciprocating motion. The present invention is particularly, but not exclusively, useful as a linear actuator which achieves high-speed reciprocating motion of its coil by reducing the response time of the coil to the applied current and by minimizing induced current in the coil which acts as a damping force that hinders the desired reciprocating motion.

BACKGROUND OF THE INVENTION

Linear actuators in which an electric current is selectively applied to an internal electromagnetic coil to cause a reciprocating motion of the coil relative to the rest of the actuator are well known in the prior art. As is also well known, there are certain inherent problems associated with this type of linear actuator. Some of these problems include an undesirable delay, or current onset response, between the time when the current is applied to the coil and the time when the current actually acts on and moves the coil. Additionally, once the coil is in motion, metallic portions of the coil can create an induced current which will act as a damping force that can oppose the desired reciprocating motion of the electromagnetic coil.

It is well established that the current onset response for an electromagnetic coil can be described by the relationship $\tau = N\Phi/IR$. In this relationship, $\tau$ is the transient time constant of the coil, $N$ is the number of turns of conductive winding around the coil, $\Phi$ is the magnetic flux of the coil, $I$ is the applied current to the coil, and $R$ is the electrical resistance of the coil. As required by the above relationship, the time constant $\tau$ is proportional to the magnetic flux $\Phi$ of the coil. Thus, if the magnetic flux $\Phi$ of the coil is reduced, the electric transient time constant $\tau$ is correspondingly reduced, and this results in a reduced time of current onset to the electromagnetic coil. Importantly, with a reduced current onset time, the coil responds more quickly to an applied current. Thus, reducing the magnetic flux of the coil can result in a more precise reciprocating motion in response to a selectively applied current.

As stated above, in addition to current onset conditions, the metallic portions of an electromagnetic coil can create an induced current which will act as a damping force once the coil is in motion. Such damping forces, of course, hinder the motion of the coil and should be minimized. One possible solution would be to use non-metallic components in the coil to minimize the effects of induced current. If non-metallic materials are used, however, the coil may not be capable of withstanding the excess heat that is likely to be generated by high speed actuator operations. Further, if the coil cannot withstand the excess heat, the coil can deform, and the actuator will eventually fail. Metallic materials, then, are preferred for the manufacture of the coil.

In light of the above, it is an object of the present invention to provide a linear actuator which has a reduced response time to a selectively applied electrical current for more precise reciprocating motion. It is another object of the present invention to provide a linear actuator with an electromagnetic coil which can withstand extreme temperatures but which minimizes the formation of induced current during high speed operations of the linear actuator. Another object of the present invention is to provide a linear actuator with an electromagnetic coil which substantially maintains its original shape during high speed operations. Yet another object of the present invention is to provide a more durable linear actuator which uses a lightweight metal bobbin for high speed reciprocating motion. Finally, another object of the present invention is to provide a linear actuator which is effectively easy to use, relatively simple to manufacture and comparatively cost effective.

SUMMARY OF THE PREFERRED EMBODIMENTS

A linear actuator in accordance with the present invention includes a magnetic member for establishing a permanent magnetic field within the actuator body. To do this, the magnetic member includes a ferrite core and a plurality of magnetic plates which are mounted on the body to surround the core. In the preferred embodiment of the present invention, an electrically conductive cover which is made of copper is laminated onto the ferrite core.

For the present invention, the linear actuator also includes a bobbin which is formed with an aperture. Specifically, this aperture extends through the bobbin along the longitudinal axis of the bobbin and establishes an inner surface which surrounds the aperture of the bobbin. Further, the bobbin is formed with a gap which extends along the length of the bobbin and is substantially parallel to the longitudinal axis of the bobbin. This gap intersects the bobbin between its inner and outer surfaces, and an insulating insert which is made of a dielectric material, usually plastic, fills the gap in the preferred embodiment of the invention. A conductive winding is then wrapped around the outer surface of the bobbin to form an electromagnetic coil, and the coil is slidingly mounted on the actuator body to receive the ferrite core therethrough. Finally, an electrical current source is connected to the winding.

In the operation of the linear actuator of the present invention, electrical current is selectively applied to the winding of the electromagnetic coil to generate a magnetic field around the coil. This generated magnetic field around the coil interacts with the permanent magnetic field in the actuator which is generated by the magnetic member. As a result, a force is generated which moves the coil, and the magnitude and direction of this generated force is manipulated by the selective application of current. In this manner, a reciprocating motion of the actuator is imparted to a working attachment, preferably a rod which is attached to the coil, to achieve a desired effect on an object.

It happens that the conductive copper cover on the ferrite core reduces the magnetic flux of the coil, and this in turn reduces the response time of the coil to the applied current. Then, once the coil is in motion, the gap in the bobbin and the insulating insert which fills the gap substantially prevent the formation of induced current on the bobbin by interrupting the path of current flow around the bobbin. As a result, the damping forces in the actuator due to induced current which would otherwise hinder the reciprocating motion of the electromagnetic coil are substantially reduced. With an improved response time, and the reduction of damping forces, a precise, high-speed reciprocating motion of the actuator can be achieved for the linear actuator of the present invention.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
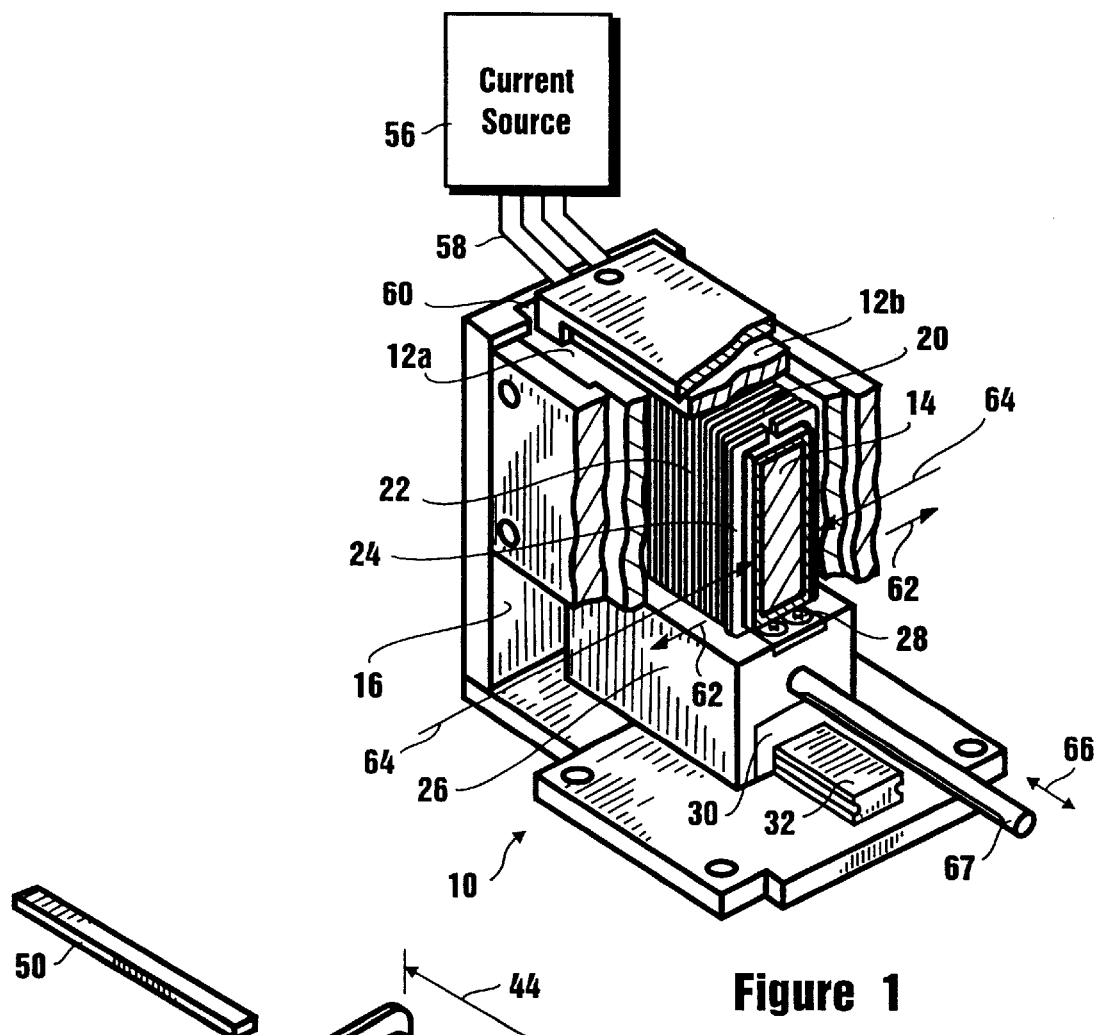
FIG. 1 is a perspective view of the linear actuator with portions cut away for clarity.

Referring initially to FIG. 1, a linear actuator in accordance with the present invention is shown and generally designated 10. In overview, a plurality of magnetic plates 12, of which the plates 12a and 12b are representative, surround a ferrite core 14. As shown, the plates 12 and core 14 are mounted on the actuator body 16. An electromagnetic coil 20 includes a winding 22 which is wrapped around a bobbin 24. For the present invention, this coil 20 is disposed around the ferrite core 14 and is positioned between the plates 12 and the core 14. Further, the bobbin 24 is mounted on a displacing unit 26 with mounting screws 28. This displacing unit 26 includes a bearing 30 which slides along a linear guide 32, as shown in FIG. 1. With this configuration, the electromagnetic coil 20 is mounted for reciprocating motion for the actuator 10 of the present invention.

Figure 2:
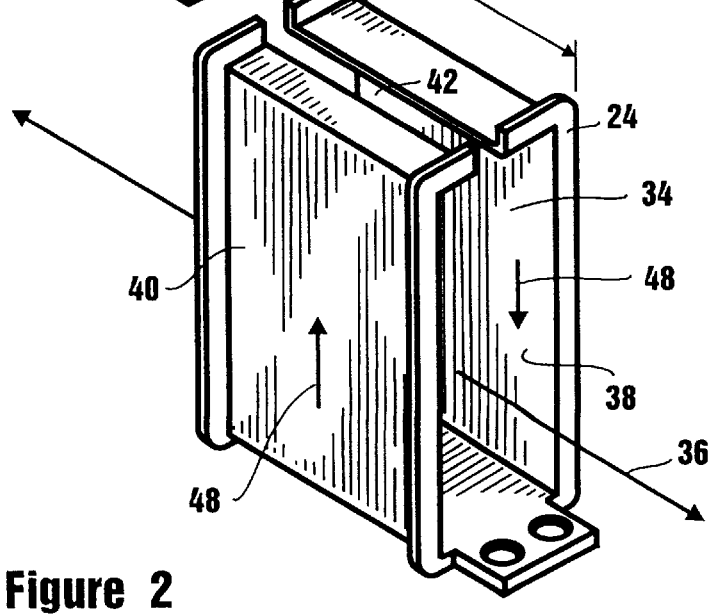
FIG. 2 is a perspective view of the bobbin and the insulating insert.

Referring now to FIG. 2, the bobbin 24 of the electromagnetic coil 20 is shown in more detail. As shown in FIG. 2, the bobbin 24 is formed with an aperture 34 which extends along a longitudinal axis 36 to establish an inner surface 38 for the bobbin 24. Further, the bobbin 24 is formed with a gap 42 which extends along the length 44 of the bobbin 24 and is substantially parallel to the longitudinal axis 36. This gap 42 intersects the respective inner and outer surfaces 38, 40 of the bobbin 24 and prevents the flow of induced current around the outer surface 40 of the bobbin 24 during operation of the actuator 10. To do this, the gap 42 interrupts the path for induced current flow in the direction as indicated by arrows 48. As shown in FIG. 2, an insulating insert 50 fills the gap 42 to further prevent the flow of induced current around the outer surface 40 of the bobbin 24. In the preferred embodiment of the invention, the bobbin 24 is made of a lightweight metal such as aluminum or titanium and the insulating insert 50 is made of a dielectric plastic material.

Figure 3:
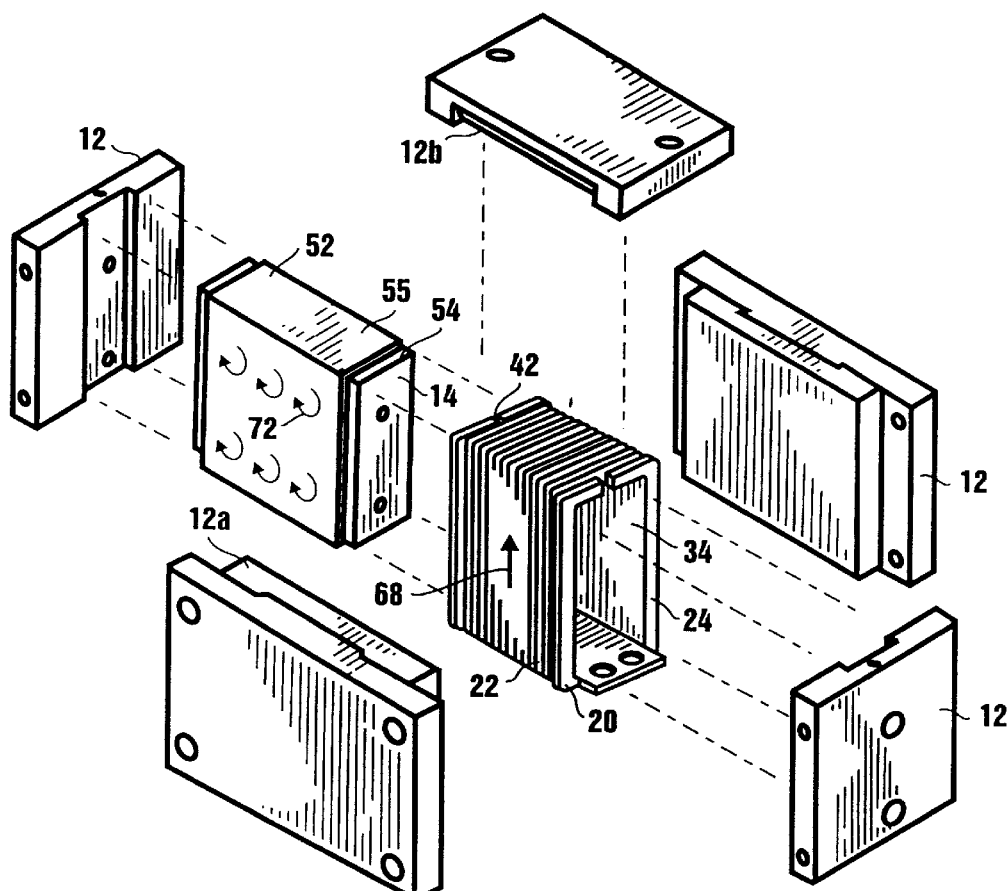
FIG. 3 is an exploded perspective view of the electromagnetic coil, magnetic plates and ferrite core of the linear actuator.

Referring now to FIG. 3, the arrangement of magnetic plates 12, ferrite core 14 and electromagnetic coil 20 in the actuator 10 of the present invention is shown in more detail. As shown in FIG. 3, a conductive cover 52 is laminated onto the surface 54 of the ferrite core 14. This conductive cover 52 is made of an electrically conductive material, preferably copper. With this configuration, the response time of the coil 20 to an applied current is reduced during an operation of the actuator 10 of the present invention.

OPERATION

In the operation of the actuator 10 of the present invention, and referring back to FIG. 1, electric current is selectively applied from a current source 56 to the winding 22 through electrical leads 58. These electrical leads 58 are run through an opening 60 between the body 16 and magnetic plates 12 to connect the current source 56 to the winding 22. Once applied, this electric current generates a magnetic field around the winding 22 in the direction as shown by arrows 62. This magnetic field which is generated from the applied current interacts with the permanent magnetic field in the actuator 10 (indicated by arrows 64) which is established by the plates 12 and ferrite core 14. This interaction of the permanent and applied magnetic fields generates a force which acts on the electromagnetic coil 20.

The force which acts on the coil 20 urges the electromagnetic coil 20 into motion in the direction as indicated by arrow 66. If the direction of the current from the current source 36 is switched to reverse the direction of applied current to the winding 22, the direction of the force which is generated will also be reversed and will urge the coil 20 in the opposite direction, as also indicated by arrow 66. Thus, reciprocating motion of the electromagnetic coil 20 is achieved from selective application of current to the coil 20 for the actuator 10 of the present invention. To obtain useful work from the reciprocating motion, a working attachment, preferably a rod 67, is attached to the displacing unit 26 of the coil 20, as shown in FIG. 1.

During the operation of the actuator 10 as described above, there is a time lag between the time when the current is applied to the coil 20 and the time when the current actually moves the coil 20. This time delay is a function of the current onset response. Referring briefly to FIG. 3, when the conductive cover 52 is laminated onto the ferrite core 14, eddy currents (shown by arrows 72) are formed on the surface 55 of the cover 52 when current (shown by arrows 68) is applied to the coil 20. These eddy currents on the surface 55 of the conductive cover 52 initially reduce the magnetic flux of the coil 20. Because the magnetic flux of the coil 20 is proportional to the current onset response, a reduction of the magnetic of the coil 20 results in a reduced current onset response. Thus, the coil 20 responds more quickly to an applied current, and a precise high-speed reciprocating motion can be achieved for the actuator 10 of the present invention.

Once the actuator 10 of the present invention is in motion, and referring briefly to FIG. 2, an induced current which would otherwise flow around the outer surface 40 of the bobbin 24 does not form. Induced current does not form because the gap 42 and insulating insert 50 interrupt the path of current flow around the outer surface 40 of the bobbin 24. Since induced current does not form in the coil 20, damping forces which are created by induced current, and which hinder the motion of the coil, are minimized. In this manner, precise high-speed reciprocating motion is achieved for the actuator 10 of the present invention.

Figure 4:
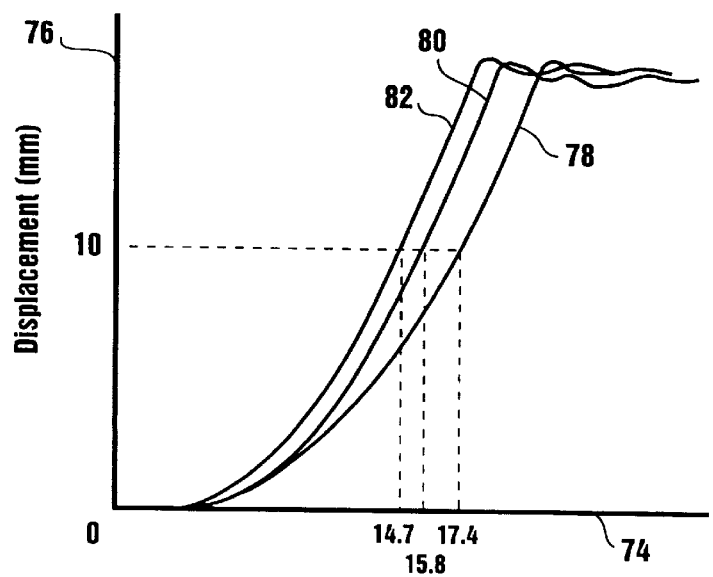
FIG. 4 is graph of time versus displacement for a linear actuator which includes performance data curves for a linear actuator which has both a bobbin with a gap and insulating insert and a core with a conductive cover, for a linear actuator which has a bobbin with a gap and insulating insert but not a conductive cover, and for an actuator which has neither a bobbin with a gap and insulating insert nor a conductive cover.

FIG. 4 graphically shows the respective effects the laminated conductive cover 52, the gap 42, and insulating insert 50 have on the performance of the actuator 10 of the present invention. Specifically, FIG. 4 is a graph of the response of the actuator 10 to an applied current as a function of time (axis 74) and displacement (axis 76). Additionally, FIG. 4 shows the response of actuator 10 to a constant 48 Volt (48V) step DC voltage input (not shown) for various configurations of the actuator 10. More specifically, performance curve 78 graphs the response of an actuator 10 which has neither a gap 42 in the bobbin 24 nor a conductive cover 52 on the ferrite core 14. Similarly, performance curve 80 graphs the response for an actuator 10 with a gap 42 and insulating insert 50 but not a conductive cover 52. Finally, performance curve 82 indicates the response for an actuator 10 which has both a bobbin 24 with a gap 42 and insert 50 and a ferrite core 14 with a conductive cover 52.

As shown in FIG. 4, performance curves 78, 80, 82 illustrate the time for a ten millimeter (10 mm) displacement of the coil 20 from rest. For an actuator 10 which has neither a gap 42 nor a conductive cover 52, the time for a 10 mm displacement is 17.4 milliseconds (17.4 ms), as shown by performance curve 78. As indicated by performance curve 80, forming the bobbin 24 of the coil 20 with a gap 42 and filling the gap 42 with an insulating insert 50 reduces the displacement time of the coil 20 to 15.8 ms. As indicated by performance curve 82, and in the preferred embodiment of the invention, an actuator 10 which has a bobbin 24 with a gap 42 and insert 50 and which has a ferrite core 14 with a conductive cover 52 has a 10 mm displacement time of 14.7 ms. Thus, for the same current input conditions, the preferred embodiment of the invention can substantially reduce the time for displacement of the coil 20 over a given distance. Stated differently, an actuator 10 in accordance with the present invention has a higher speed of motion and better acceleration than an actuator 10 which has neither a bobbin 24 formed with a gap 42 and insert 50 nor a ferrite core 14 with a conductive cover 52. Accordingly, precise high-speed reciprocating motion can be achieved for the actuator 10 of the present invention.

While the particular linear actuator and method of manufacture as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A linear actuator comprising:

a body;

a magnetic member mounted on said body and having a ferrite core to establish a permanent magnetic field;

a bobbin having an outer surface and a length, and defining a longitudinal axis, said bobbin being slidingly mounted on said body and being formed with an aperture extending through said bobbin along said axis for receiving said ferrite core therethrough, said aperture establishing an inner surface for said bobbin, and said bobbin being formed with a gap to prevent current flow on said inner and outer surface of said bobbin during bobbin movement in said permanent magnetic field, said gap extending through said length and substantially parallel to said axis and intersecting said bobbin from said outer surface to said inner surface;

a conductive winding for receiving an electrical current, said winding being wrapped around said outer surface of said bobbin;

an electrically conductive cover laminated onto said ferrite core for reducing the magnetic flux from said conductive winding; and an electrical means connected to said winding for applying said current to said winding to generate an applied magnetic field for interaction with said permanent magnetic field to move said bobbin.

2. A device as recited in claim 1 wherein said conductive cover is made of copper.

3. A device as recited in claim 1 wherein said bobbin is made of aluminum.

4. A device as recited in claim 1, further comprising:

an insulating insert, said insert being placed in said gap to fill said gap and interrupt the conductance of electricity across said gap.

5. A device as recited in claim 4 wherein said insulating insert is made of a dielectric material.

6. A device as recited in claim 1, further comprising:

a working attachment, said working attachment being attached to said bobbin for movement therewith.

7. A device as recited in claim 6, wherein said working attachment is a rod.

8. A linear actuator having a reduced response time comprising:

a body;

a magnetic member mounted on said body and having a ferrite core to establish a permanent magnetic field, said ferrite core being laminated with an electrically conductive cover;

a bobbin having an outer surface and a length, and defining a longitudinal axis, said bobbin being sliding mounted on said body and being formed with an aperture, said aperture extending through said bobbin along said axis for receiving said ferrite core therethrough, said aperture establishing an inner surface for said bobbin, said bobbin also being formed with a gap extending through said length thereof substantially parallel to said longitudinal axis and intersecting said bobbin from said outer surface to said inner surface;

a conductive winding for receiving an electrical current, said winding being wrapped around said outer surface of said bobbin; and an electrical means connected to said winding for applying said current, said current to generate an applied magnetic field for interaction with said permanent magnetic field to move said bobbin.

9. A device as recited in claim 8 wherein said conductive cover is made of copper.

10. A device as recited in claim 8 wherein said bobbin is made of aluminum.

11. A device as recited in claim 8, further comprising:

a working attachment, said working attachment being attached to said bobbin for movement therewith.

12. A device as recited in claim 8, further comprising:

an insulating insert, said insert being placed in said gap to fill said gap and interrupt the conductance of electricity across said gap.

13. A device as recited in claim 12 wherein said insulating insert is made of a dielectric material.

14. A method for obtaining precise high-speed reciprocating motion in a linear actuator having a reduced response time, comprising the steps of:

providing a body;

providing a ferrite core;

laminating an electrically conductive cover on said ferrite core;

mounting a magnetic member on said body to establish a permanent magnetic field in said actuator, said member including said ferrite core;

slidingly mounting an elongated bobbin on said body, said bobbin having a length and an outer surface, and defining a longitudinal axis, said bobbin being formed with an aperture, said aperture extending through said bobbin along said axis for receiving said ferrite core therethrough, said aperture establishing an inner surface for said bobbin;

cutting a gap in said bobbin, said gap extending substantially parallel to said axis and intersecting said bobbin from said outer surface to said inner surface of said bobbin;

wrapping a winding around said outer surface of said bobbin; and selectively applying an electric current to said winding to generate an applied magnetic field for interaction with said permanent magnetic field to move said bobbin.

15. A method as recited in claim 14 wherein said conductive cover is made of copper.

16. A method as recited in claim 14, further comprising the step of:

placing an insulating insert in said gap.

17. A method as recited in claim 16 wherein said insulating insert is made of a dielectric material.

* * * * *

UNITED STATES PATENT AND TRADEMARK OFFICE
Certificate

Patent No. 6,118,360                                                                                      Patented: September 12, 2000

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Edward A. Neff, Rancho Sante Fe, CA; David Huang, Carlsbad, CA; Cia-Tung Chen, Fullerton, CA; and Tom Simunovic, Vista, CA.

Signed and Sealed this Fifth Day of March 2002.

MICHAEL L. GELLNER
*Supervisory Patent Examiner*
Art Unit 2800